March 11, 1958 W. J. CLEVER 2,826,432
SELF-LATCHING TRACTOR COUPLING
Filed July 7, 1955
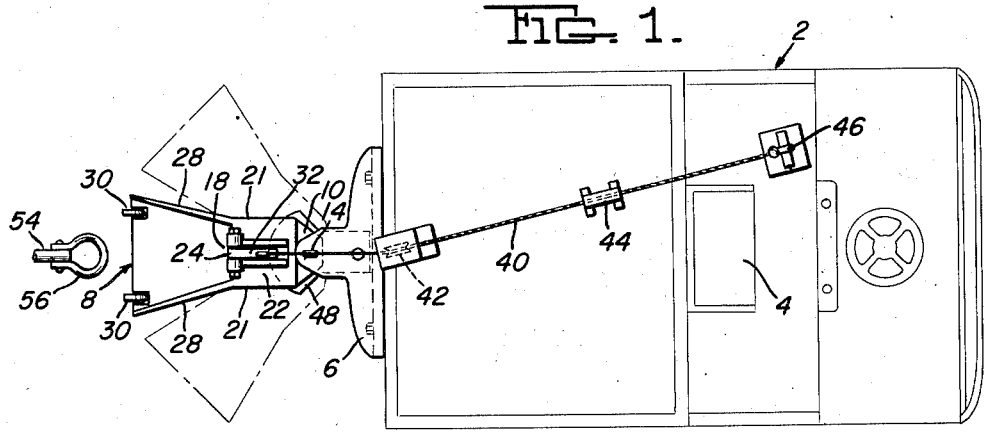
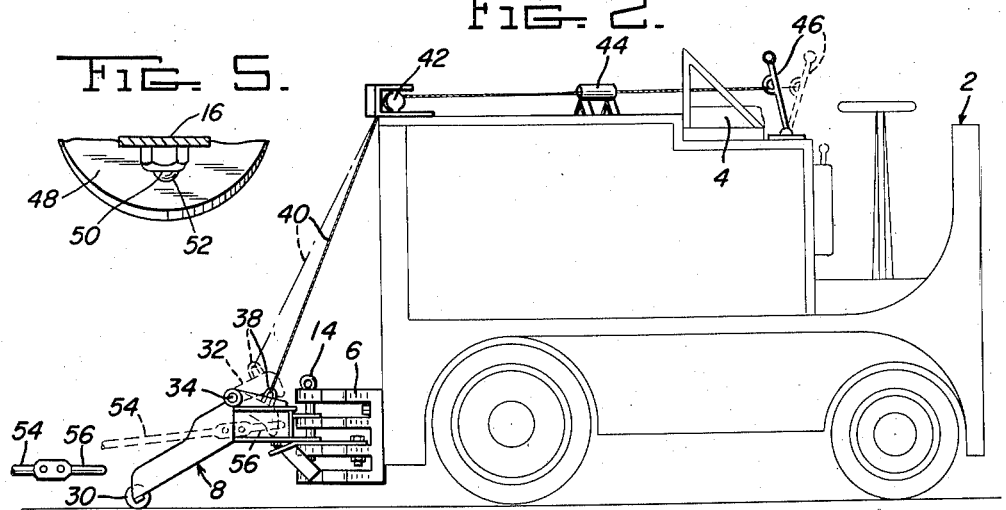
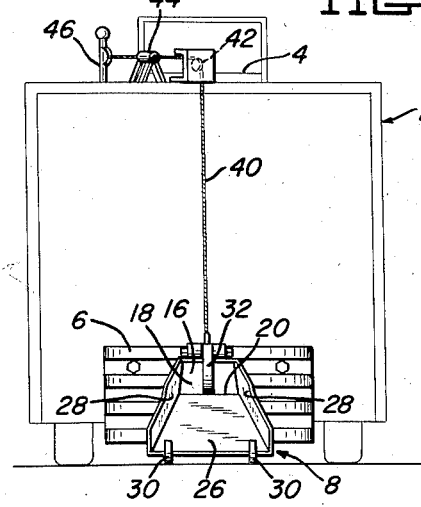
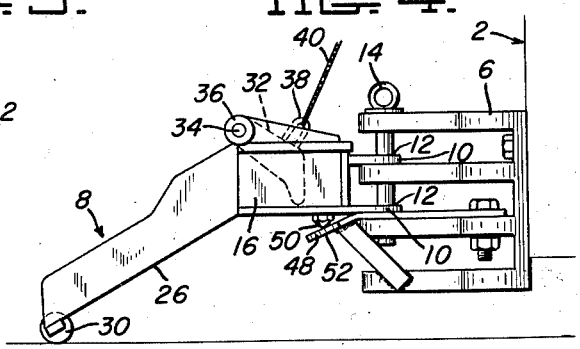
INVENTOR:
WILLIAM J. CLEVER,
BY: Donald G. Dalton
his Attorney.

United States Patent Office 2,826,432
Patented Mar. 11, 1958

2,826,432

SELF-LATCHING TRACTOR COUPLING

William J. Clever, Vandergrift, Pa., assignor to United States Steel Corporation, a corporation of New Jersey Application July 7, 1955, Serial No. 520,415

4 Claims. (Cl. 280—477)

The present invention relates to an improved self-latching coupling for a tractor hitch.

Although many types of specialized wheeled handling devices are used to transport manufactured products or raw materials from one processing unit to another in industrial plants, in many instances ordinary wagon type vehicles are still utilized for this purpose. This type of vehicle is usually provided with a swiveled front wheel carriage having a draw bar projecting therefrom. The draw bar is pivotally attached to the carriage so that the bar can be raised and lowered to facilitate pulling and positioning of the vehicle. Frequently the free end of the draw bar is provided with a large diameter loop handle to accommodate the gloved hands of a workman where it is necessary to position the vehicle manually. When the vehicle is to be drawn by a tow tractor, the draw bar is coupled to the conventional pin and clevis type hitch provided on the rear end of the tractor by inserting the loop handle of the draw bar into the clevis and passing the pin through the eye of the loop to secure the draw bar to the tractor hitch. Prior to my invention it was necessary to accomplish the coupling operation just described manually since the loop handled draw bar is not readily adaptable for use with presently available conventional self-latching couplers.

It is accordingly, an object of my invention to provide a coupling attachment for a tractor hitch which includes a ramp for receiving and guiding the loop handle of a draw bar and a self-latching mechanism associated with the ramp for receiving the handle and securing the draw bar in towing position.

It is another object of my invention to provide a coupling attachment of the class described which is provided with means cooperative with the tractor hitch which automatically centers the coupling attachment relative to the tractor when the coupling is disengaged from a draw bar.

It is a further object of my invention to provide a coupling attachment of the class described which can be operated by the tractor operator from his normal driving position on the tractor without the necessity of assistance from another workman.

It is a further object of my invention to provide a coupling attachment of the class described which is simple and rugged in structure, inexpensive to manufacture and which may be easily and quickly mounted on a conventional existing tractor hitch.

These and other objects will become more apparent after referring to the following specification and attached drawings in which:

Figure 1 is a plan view;
Figure 2 is a side elevational view;
Figure 3 is an end view;
Figure 4 is an enlarged detail side elevational view; and
Figure 5 is an enlarged partial view in elevation looking toward the right of Figure 4 showing the detent and cooperating plate of the coupling.

Referring more particularly to the drawings reference numeral 2 designates a tow tractor provided at its rear with a conventional pin and clevis hitch 6 to which is attached a preferred embodiment of the self-latching coupling of my invention, designated generally by reference numeral 8.

The improved coupling 8 includes a guide frame having a pair of vertically spaced horizontal flanges 10 at one end adapted for insertion into the clevis of the hitch 6 as best shown in Figure 4. The flanges 10 are provided with registering holes 12 for receiving the pin 14 of the tractor hitch to pivotally secure the coupling in the clevis. The portion of the coupling immediately adjacent the flanges 10 is recessed portion or box 16 having an open end 18, bottom 20, sides 21 and a top 22 which is provided with an open end longitudinal slot 24. A ramp 26 extends angularly and downwardly from the open end of the recessed portion 16. The open end of the slot 24 is adjacent the open end of the portion 16. The sides of the ramp 26 are provided with upwardly projecting walls 28 which converge slightly from the bottom to the top of the ramp. The bottom of the ramp has a pair of spaced rollers 30 rotatably mounted therein for supporting the bottom end of the coupling and prevent bind of flanges 10 on the pin 14.

A lever 32 is rotatably mounted on a shaft 34 which is journaled in bearings 36 disposed on the upper surface of the box 16 astride the open end of the slot 24. The free end of the lever 32 normally rests within the recessed portion 16 and has a bracket 38 attached to its upper portion. A cable 40 is attached by one end to the bracket 38, and extends therefrom upwardly around a pulley 42 then through a guide 44 to attachment with a control lever 46. The control lever 46 is pivotally mounted on the tractor adjacent the operator's seat 4 so that the lever 32 may be raised by manipulation of the control lever 46 by the tractor operator.

A plate 48 is attached to the hitch 6 and projects angularly and downwardly therefrom under the recessed portion 16 of the coupling 8. A ball bearing detent 50 is disposed on and depends from the under surface of the recessed portion 16 substantially halfway between its side edges remote from the ramp 26. The ball bearing detent 50 is adapted to roll on the angularly disposed surface of the plate 48. A hole 52 having a diameter approximately one half of the diameter of the ball bearing detent is provided in the angularly disposed surface of the plate 48 adjacent its free end and substantially midway between its side edges. The hole 52 serves as a seat for releasably holding the ball bearing detent 50. This arrangement insures the return of the coupling 8 to a center position relative to the hitch 6 when disengaged from a draw bar of a vehicle. Since the inclined surface of the plate 48 does not lie in a plane parallel with the horizontal plane of rotation of the coupling 8, any rotation of the coupling about the pin 14 from the center of the plate will cause the detent ball to ride up the inclined surface of the plate when the coupling is disengaged. Gravity will cause the detent to drift down the inclined surface of the plate to its center lock position when the coupling is disengaged. In other words detent 50 and hole 52 together function to return the coupling 8 to a center position relative to the hitch 6 when the coupling is disengaged from a draw bar. Centering of the coupling relative to the tractor hitch facilitates maneuvering of the tractor to engage a draw bar. The detent and hole fix the coupling in position when it is not engaged with a draw bar so that the operator can drive the tractor rearwardly to move the coupling against the end of a draw bar to cause it to move up the ramp of the coupling into the recessed portion where it can be engaged by the lever 32. With the coupling fixed in position there is no need for the operator to dismount or rely on the aid of another workman to engage a draw bar. If the coupling were permitted to rotate freely about the pin 14, the operator would have some difficulty and require more time to manipulate the tractor into suitable position for engaging a draw bar. It would be necessary for the operator to ascertain the position of the coupling in order to know how to maneuver his tractor to engage the draw bar. Once the draw bar is engaged the transverse force exerted by it while the tractor is in motion, particularly on an irregular course, prevents the detent from remaining in the hole. While the tractor is pulling the draw bar the coupling itself would move up and down on the pin 14 so that at times the ball 50 would not be in contact with the surface of the plate 48.

In operation, to couple the tractor 2 with a draw bar 54 having a loop handle 56 at its free end, the tractor 2 is backed into the draw bar 54. As the tractor moves toward the wagon to which the draw bar is attached, the handle end 56 of the draw bar rides up the ramp 26 and enters the recessed portion 16 to engage the lever 32. To uncouple the draw bar 54 from the tractor, the control lever 46 is moved to its front position, as shown in broken lines in Figure 2, to disengage the lever 32 and the tractor is driven away before allowing the control lever 46 to return to its normal position.

While one embodiment of my invention has been shown and described, it will be apparent that other adaptations and modifications may be made without departing from the scope of the following claims.

I claim:

1. In a tractor having a hitch attached thereto the improvement therewith of a self-latching coupling for a vehicle draw bar having a hole in its free end which comprises a guide frame pivotally attached by one end to said hitch, said guide frame including a recessed portion extending longitudinally from said hitched end, a ramp extending at an angle downwardly from said recessed portion, and upwardly projecting sidewalls on said ramp, said ramp being adapted to receive the free end of said bar and conduct it to said recessed portion when the guide frame is moved against the free end of said bar, said recessed portion being open at its top and on its end adjacent said ramp for receiving the free end of said bar, a detent attached to and depending from the underside of said recessed portion substantially midway between its sides, a plate attached to said hitch having a surface projecting angularly downwardly from said hitch and extending under and in contact with said detent, means on said plate surface for yieldably restraining the movement of said detent to restrain lateral movement of said guide frame relative to said hitch prior to a coupling operation, a lever pivotally mounted by one end on said frame adjacent the open top of said recessed portion with its free end normally extending toward the hitched end of said frame and downwardly into said recessed portion, said lever being adapted to engage the hole in said draw bar to releasably secure the same, and means attached to said lever for raising its free end out of engagement with said draw bar.

2. In a tractor having a hitch attached thereto the improvement therewith of a self-latching coupling for a vehicle draw bar having a hole in its free end which comprises a guide frame pivotally attached by one end to said hitch, said guide frame including a recessed portion extending longitudinally from said hitched end, a ramp extending at an angle downwardly from said recessed portion, and upwardly projecting sidewalls on said ramp, said ramp being adapted to receive the free end of said bar and conduct it to said recessed portion when the guide frame is moved against the free end of said bar, said recessed portion being open at its top and on its end adjacent said ramp for receiving the free end of said bar, a ball bearing detent rotatably attached to and depending from the under-side of said recessed portion substantially midway between its sides, a plate attached to said hitch having a surface projecting angularly downwardly from said hitch and extending under and in contact with said detent, said plate surface having a hole therein adjacent its lower edge approximately midway between its sides for yieldably seating said roller bearing detent to thereby center said guide frame relative to said hitch prior to a coupling operation, said last-mentioned hole having a diameter less than the diameter of said roller bearing detent, a lever pivotally mounted by one end on said frame adjacent the open top of said recessed portion with its free end normally extending toward the hitched end of said frame and downwardly into said recessed portion, said lever being adapted to engage the hole in said draw bar to releasably secure the same, and means attached to said lever for raising its free end out of engagement with said draw bar.

3. In a tractor having a hitch attached thereto the improvement therewith as defined by claim 2 characterized by a pair of spaced supporting rollers rotatably disposed in the free end of said ramp.

4. In a tractor having a hitch attached thereto the improvement therewith as defined by claim 2 characterized by said means for raising the free end of said lever including a control cable attached at one end to the upper portion of said lever adjacent the free end thereof, and a control lever pivotally mounted adjacent the operator's position on said tractor, the opposite end of said cable being attached to said control lever whereby said first named lever is pivoted by manipulation of said last named control lever.

References Cited in the file of this patent

UNITED STATES PATENTS

| | | |
|---|---|---|
| 1,145,026 | Lechtenberg | July 6, 1915 |
| 1,319,224 | Keesler | Oct. 21, 1919 |
| 2,062,282 | Acton | Dec. 1, 1936 |
| 2,556,748 | Buckley | June 12, 1951 |
| 2,671,673 | Benson | Mar. 9, 1954 |
| 2,699,341 | Brettrager | Jan. 11, 1955 |